Nov. 27, 1923.

H. D. MURDOCK

MOTOR CONTROL SYSTEM

Filed March 5, 1921

1,475,854

WITNESSES:

INVENTOR
Henry D. Murdock.
BY
ATTORNEY

Patented Nov. 27, 1923.

1,475,854

UNITED STATES PATENT OFFICE.

HENRY D. MURDOCK, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed March 5, 1921. Serial No. 449,646.

*To all whom it may concern:*

Be it known that I, HENRY D. MURDOCK, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to systems employed for operating a plurality of motors, some or all of which are connected in parallel relation.

The object of my invention is to prevent the main reverser of an electric car from being operated to reverse the motor connections when the car is coasting above a predetermined speed.

In some forms of motor-control systems, in which a plurality of motors are employed, great damage may occur to the motors and control apparatus, if the main reverser is actuated while the motors are mechanically driven by the momentum of a load connected thereto as short circuits are established upon the motors being disconnected from a source of electrical energy.

Briefly speaking, my invention consists in providing a relay for preventing the operation of the main reverser for a plurality of motors, the relay being governed by some electrical operating condition, preferably the voltage, of a motor during the period that the motor is disconnected from a source of electrical energy and is being mechanically driven as a generator. My invention also consists in providing a push-button switch for rendering the relay inoperative if an emergency occurs to make dynamic braking imperative.

For a better understanding of my invention, reference should be made to the accompanying drawing—

Figure 1:
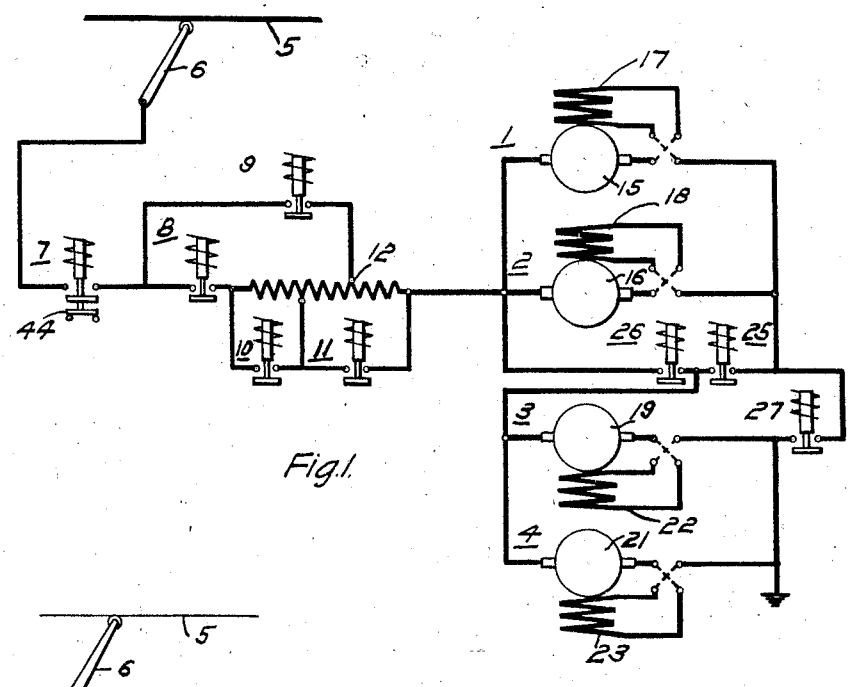
Figure 2:
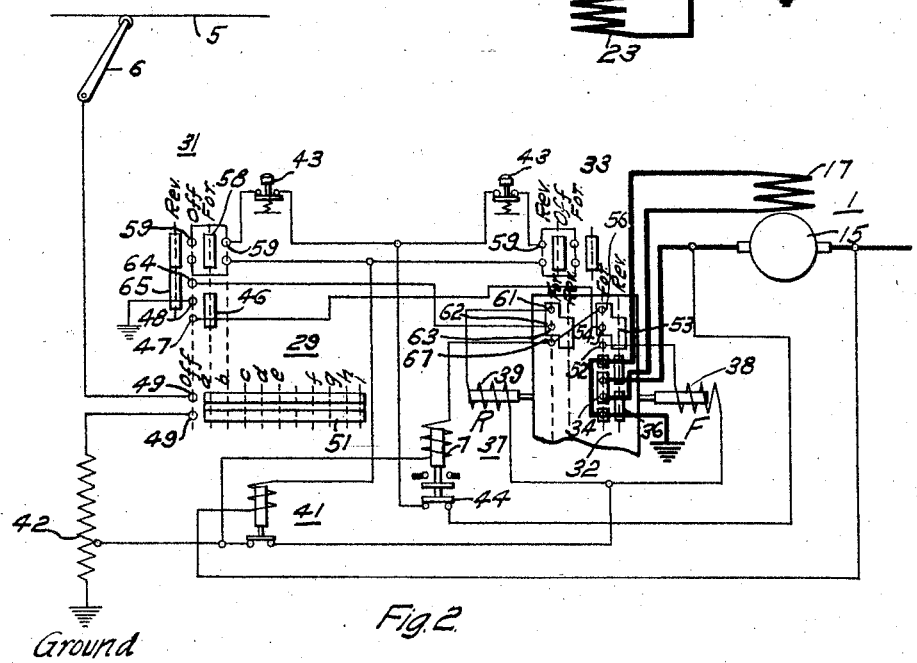

Figure 1 of which is a schematic view of a motor-control system embodying my invention and Fig. 2 is a diagrammatic view of an auxiliary control system that may be employed for governing the operation of the switches or contactors shown in Fig. 1.

Referring particularly to Fig. 1, a plurality of motors 1, 2, 3 and 4 may be energized from a source of electrical energy, such as a trolley 5, through a trolley pole 6, a line switch or circuit breaker 7, accelerating contactors 8, 9, 10 and 11 and a starting resistor 12.

The motors 1 and 2 are connected in parallel relation and have armatures 15 and 16, respectively, and series field magnet windings 17 and 18, respectively. Motors 3 and 4 are connected in parallel relation and have armatures 19 and 21, respectively, and series field-magnet windings 22 and 23, respectively.

The group of motors 1 and 2 may be connected in series relation with the group of motors 3 and 4 by means of a series contactor 25 and may be connected in parallel relation thereto by means of parallel contactor 26 and ground contactor 27, in accordance with well-known practice. Therefore, the operation of the transitional contactors 25, 26 and 27 will not be described in detail.

Referring to Fig. 2, a master controller 29 for governing the operation of the transitional contactors 25, 26 and 27 and of the accelerating contactors 8, 9, 10 and 11 is shown. A master reverser 31 for governing a main reverser 32 is shown at the forward part of an electric car or locomotive. A portion of a similar master reverser 33 is shown at the rear of the car.

The master reversers 31 and 33 govern the operation of the main reverser 32, which controls the forward and reverse operation of the motors 1, 2, 3 and 4. For the sake of convenience and simplicity, the main connections of the motor 1 are shown in detail in Fig. 2.

Armature 15 and series field-magnet winding 17 of the motor 1 are electrically connected to a plurality of contact terminals 34 of the master reverser 32. Contact segments 35 and 36 of the main reverser 32 are adapted to so engage the contact terminals 34 that the terminals of the series field-magnet winding 17 may be connected in different relation to the terminals of the armature 15 to effect forward and reverse operation, respectively, of the motor 1.

The reversing contact segments and contact terminals for the motors 2, 3 and 4 are mounted upon the main reverser 32, in the same maner as contact terminals 34 and contact segments 35 and 36 are mounted. An electrical actuating device 37 for the main reverser 32 comprises a forward actuating coil 38 and a reverse actuating coil 39. One terminal of each of the actuating coils 38 and 39 is connected by a circuit comprising a contact member of a relay 41 to a control resistor 42.

The actuating coil of the relay 41 is connected to the terminals of the armature 15 of the motor 1 by a circuit comprising either the master reverser 31 or the master reverser 33, one of the push-button switches 43 and the auxiliary contact member 44 of the circuit-breaker 7, as will hereinafter be more fully described.

The master reverser 31 is preferably mechanically interlocked with the master controller 29, so that the master reverser 31 cannot be actuated unless the master controller 29 is in its "off" position. The master reverser 33 is likewise mechanically interlocked with the master controller at the rear of the car. This interlocking is in accordance with standard railway practice and, therefore, need not be described here.

The operation of the control system is begun by actuating the master reverser 31 in a forward direction, whereupon a contact segment 46 thereof engages contact terminals 47 and 48, and then actuating the master controller 29 from the "off" position to position $a$. A circuit is then established from the trolley 5 through the trolley pole 6, contact terminals 49, contact segment 51 of the master controller 29 and control resistor 42 to ground. All of the control switches have their actuating coils energized through control resistor 42 in accordance with a familiar practice.

Upon the energization of control resistor 42, a circuit is established therefrom through the contact members of the relay 41, the forward actuating coil 38, contact terminals 52 and 54 of the main reverser 32, which are bridged by contact segment 53 thereof, contact terminals 47 and 48 of the main reverser 31 and contact segment 46 to ground. The energization of the actuating coil 38 causes the main reverser 32 to be operated from its reverse position to its forward position, whereupon the circuit of actuating coil 38 is broken. The main reverser 32 is illustrated in Fig. 2 of the drawing, as being in its forward position.

When the main reverser 32 has been actuated to its forward position, a circuit is established from the control resistor 42 through the actuating coil of circuit-breaker 7, contact terminal 56 of the main reverser 32, contact segment 53, contact terminal 54, contact terminal 47 of the master reverser 31, contact segment 46 and contact terminal 48 to ground. The energization of the actuating coil of the circuit-breaker 7 causes the circuit-breaker to close. The accelerating contactor 8 is closed by establishing a circuit comprising the control resistor 42 and the actuating coil of the contactor 8, when the master controller 29 occupies position $a$.

The acceleration of the motors 1, 2, 3 and 4 is first effected by shunting various portions of the starting resistor 12 by means of accelerating contactors 8, 9, 10 and 11. The next step consists in changing the relation of the group of motors 1 and 2 to the group of motors 3 and 4 by opening series contactor 25 and closing parallel contactor 26 and ground contactor 27, thereby connecting the groups of motors 1 and 2, and 3 and 4 in parallel relation and simultaneously inserting portions of the starting resistor 12 in circuit therewith.

The motors 1, 2, 3 and 4 are further accelerated by shunting portions of the starting resistor 12, after the groups of motors 1 and 2, and 3 and 4 are connected in parallel relation. These operations are in accordance with standard practice and will not be further described. Moreover, auxiliary control circuits for governing the accelerating contactors 8, 9, 10 and 11, series contactor 25, parallel contactor 26 and ground contactor 27, for the sake of clearness, have not been shown, but may readily be supplied by those versed in the art.

If the car is running down grade, the motorman may reduce its speed by actuating the master controller 29 in a reverse direction and applying the air brakes, which are not shown. If the car is going at relatively great speed, the control system may be impaired by dynamic-braking or plugging; therefore, it is desirable that the operator shall keep his car under control at all times and that dynamic braking and plugging shall be employed only during emergencies.

After actuating the master controller 29 to the "off" position, a circuit comprising the actuating coil of the relay 41 will be established from one terminal of the armature 15 of the motor 1 through the actuating coil of the relay 41, contact segment 58 and contact terminals 59 of the master reverser 31, contact members of push-button switch 43 and auxiliary contact member 44 of the circuit-breaker 7 to the other terminal of the armature 15 of the motor 1.

If the power generated by the armature 15 of the motor 1, is sufficient to actuate the relay 41 to its open position, a circuit comprising either the actuating coil 38 or the coil 39 of the electric device 37 will be open, thereby preventing the forward or reverse movement of the main reverser 32, if either of the master reversers 31 and 33 is actuated in a reverse direction. When the motor 1 is disconnected from the trolley 5 upon the opening of the line switch 7, the motor 1 is energized by having its armature 15, its series field-magnet winding 17 and the armature 16 and the series field-magnet winding 18 of the motor 2 connected in a closed circuit, the armatures 15 and 16 being mechanically driven by the momentum of the car.

The current generated by the motors 1, 2, 3 and 4 will be of relatively low value because of the unreversed manner in which the field-magnet windings 17, 18, 23 and 22 are connected to the corresponding armatures 15, 16, 19 and 21.

The relay 41 may be designed to close at any predetermined value of current, corresponding to a given coasting speed of the car.

If, for any reason, plugging is considered necessary, the operator will reverse the master reverser, after returning the master controller to the "off" position, and then actuate the master controller to position $a$. A circuit is thus established from the control resistor 42 through contact members of the relay 41, the reverse actuating coil 39 of the electrical device 37, contact terminal 61 of the main reverser 32, contact segment 62, contact terminal 63, contact terminal 64 of the master reverser 31, contact segment 65 and contact terminal 48 to ground.

The main reverser 32 will be actuated in a reverse direction by the energization of the actuating coil 39, and the series field-magnet windings 17, 18, 22 and 23 of the motors 1, 2, 3 and 4, respectively, will have their respective terminals connected in different relation to the corresponding armatures 15, 16, 19 and 21. When the main reverser 32 has assumed its reverse position, a circuit is established from the control resistor 42 through the actuating coil of the circuit-breaker 7, contact terminal 67 of the main reverser 32, contact segment 62, contact terminal 63, contact terminal 64 of the master reverser 31, contact segment 65 and contact terminal 48 to ground.

The energization of the actuating coil of the circuit-breaker 7 will cause it to close, thereby effecting plugging of the motors 1, 2, 3 and 4 with the full starting resistor 12 in circuit therewith.

If, for any reason, it should be desirable to effect dynamic braking of the motors 1, 2, 3 and 4, after the motors have been plugged, this action may be effected by actuating the master controller 29 to its "off" position, thereby de-energizing the control resistor 42 and thus all of the control contactors, with the exception of the reversing switches mounted upon the main reverser 32.

The dynamic-braking circuits established by reversing the relation of the field-magnet windings 17, 18, 22 and 23 to the armatures 15, 16, 22 and 23, respectively, comprise the parallel-connected motors 1 and 2 and the parallel-connected motors 3 and 4.

From the above description, it is apparent that, by employing a relay having its actuating coil electrically connected across the terminals of the armature of a motor and in series relation with an auxiliary contactor of a line switch, the relay will prevent the movement of the main reverser when the line switch is open and the motor is being driven as a generator, whereby protection for the motors is provided against dangerous electrical overloads caused by dynamic braking or plugging after a car has attained great speed.

While I have shown my invention in a preferred form, minor modifications in the arrangement of circuits and apparatus employed may be made without departing from the spirit of my invention. I desire, therefore, to be limited only by the scope of the appended claims.

I claim as my invention:

1. The combination with a motor and means comprising a master reverser and a main reverser for reversing the operation thereof, of means governed by the electrical condition of said motor and the position of said master reverser for preventing said main reverser from operating, and means for rendering said preventing means inoperative during emergency conditions.

2. The combination with a motor, of a source of electrical energy, a switch for connecting said motor to said source, means for reversing the direction of operation of said motor, and means governed by said switch and the electrical condition of said motor for preventing the operation of said reversing means during the period that the energization of said motor is greater than a predetermined value, and means for rendering said preventing means inoperative during emergency conditions.

3. The combination with a plurality of motors connected in parallel relation, of means for reversing the direction of operation of said motors, said reversing means operating to effect dynamic braking when said motors are driven mechanically, and means governed by the electrical condition of one of said motors for preventing said reversing means from operating to secure dynamic braking.

4. The combination with a plurality of motors connected in parallel relation, of means for reversing the operation of said motors, said reversing means operating to effect dynamic braking during the period in which said motors are driven mechanically, means governed by the electrical condition of one of said motors for preventing said reversing means from operating to secure dynamic braking and means for operating said reversing means during an emergency.

5. The combination with a plurality of motors and a source of electrical energy, of a switch for connecting said motors to said source, a main reverser for reversing the direction of operation of said motors, means for actuating said reverser and means governed by the electrical condition of one of said motors for preventing said actuating means from operating said controller, said governing means being inoperative when said switch occupies its closed position.

6. The combination with a plurality of motors, each having an armature and a series field-magnet winding, said motors being connected in parallel relation, of a main reverser for reversing the connections of said windings to said armatures, an electrical device for actuating said reverser, a master reverser for governing the energization of said device, a source of electrical energy for said motors, a switch for connecting said motors to said source, means comprising a relay connected across the armature of one of the motors for preventing the operation of said device when said switch is in its open position and the voltage of said motor is above a predetermined value, and means for rendering said relay inoperative during emergency conditions.

7. The combination with a plurality of motors, of means comprising a reverser for effecting dynamic braking of said motor, automatic means for preventing the actuation of said reverser upon said motors being subjected to a predetermined braking effect and means for rendering said automatic means inoperative during an emergency.

8. The combination with a plurality of motors, of a main reverser having a plurality of positions for changing the direction of operation of said motors, a master reverser having a plurality of positions for governing the operation of said main reverser, a controller for governing the speed of said motors, and means governed by the positions of said master reverser, controller and the electrical condition of said motors for preventing the actuation of said main reverser.

9. The combination with a motor, of a main reverser for changing the direction of operation of said motor, means comprising a master reverser for actuating said main reverser, a controller having a plurality of positions for governing the speed of said motor, a relay device governed by the electrical condition of said motor to prevent said actuating means from functioning during braking of said motor, said relay device being operative only upon said master reverser and said controller being actuated to predetermined positions.

10. The combination with a motor, of a main reverser for changing the direction of operation of said motor, means comprising a plurality of coils for governing said reverser, a master reverser for selectively energizing said coils, a relay device governed by the electrical condition of said motor to prevent the energization of said coils during electrical braking, and means comprising a line switch for energizing said motor, said device being rendered inoperative upon said line switch occupying its closed position.

In testimony whereof, I have hereunto subscribed my name this 26th day of February 1921.

HENRY D. MURDOCK.